(12) United States Patent
Matsuda et al.

(10) Patent No.: US 11,859,559 B2
(45) Date of Patent: Jan. 2, 2024

(54) ELECTRIC POWER GENERATING APPARATUS FOR USE IN AIRCRAFT

(71) Applicant: KAWASAKI JUKOGYO KABUSHIKI KAISHA, Kobe (JP)

(72) Inventors: Kippei Matsuda, Kobe (JP); Kenji Usuki, Kobe (JP); Tatsuhiko Goi, Kobe (JP); Kenichiro Tanaka, Kobe (JP); Hideyuki Imai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 429 days.

(21) Appl. No.: 17/294,017

(22) PCT Filed: Nov. 19, 2018

(86) PCT No.: PCT/JP2018/042644
§ 371 (c)(1),
(2) Date: May 14, 2021

(87) PCT Pub. No.: WO2020/105084
PCT Pub. Date: May 28, 2020

(65) Prior Publication Data
US 2022/0003171 A1 Jan. 6, 2022

(51) Int. Cl.
*F02C 7/36* (2006.01)
*B64D 27/24* (2006.01)
(Continued)

(52) U.S. Cl.
CPC ............... *F02C 7/36* (2013.01); *B64D 27/24* (2013.01); *B64D 35/00* (2013.01); *H02K 7/116* (2013.01);
(Continued)

(58) Field of Classification Search
CPC ... B64D 27/24; B64D 35/00; F05D 2220/323; F05D 2220/76; F05D 2220/766;
(Continued)

(56) References Cited

U.S. PATENT DOCUMENTS 4,315,442 A * 2/1982 Cordner .................. F02N 15/04
475/12
4,734,590 A * 3/1988 Fluegel .................. H02K 7/006
290/46

(Continued)

FOREIGN PATENT DOCUMENTS

EP 2551494 A2 1/2013
JP 2001-158400 A 6/2001
(Continued)

*Primary Examiner* — Naishadh N Desai
(74) *Attorney, Agent, or Firm* — Sughrue Mion, PLLC

(57) ABSTRACT

An electric power generating apparatus for use in an aircraft is an electric power generating apparatus connected through an emergency cut-off device to a gear box such that the gear box can transmit power to the electric power generating apparatus, the gear box being configured to decrease speed of rotational power of an aircraft engine. The electric power generating apparatus includes: a manual transmission configured to change the speed of the rotational power transmitted from the emergency cut-off device and including a plurality of gear stages; and an electric power generator to which the rotational power which has been changed in speed by the manual transmission is transmitted.

8 Claims, 4 Drawing Sheets

(51) Int. Cl.
*B64D 35/00* (2006.01)
*H02K 7/116* (2006.01)
*F16H 37/02* (2006.01)

(52) U.S. Cl.
CPC .. *F05D 2220/323* (2013.01); *F05D 2220/766* (2013.01); *F05D 2260/40* (2013.01); *F16H 37/02* (2013.01)

(58) Field of Classification Search
CPC .......... F05D 2260/40; F02C 7/32; F02C 7/36; F16H 37/02; F16H 15/38; F16H 2200/0034; F16H 2200/2035; F16H 2200/2066; F16H 2200/2082; F16H 3/54; F16H 37/022; H02K 7/116; F01D 21/00
See application file for complete search history.

(56) References Cited

U.S. PATENT DOCUMENTS

| | | | |
|---|---|---|---|
| 2001/0003108 A1* | 6/2001 | Goi | F16H 37/086 475/216 |
| 2004/0098988 A1* | 5/2004 | Goi | F02C 7/36 60/793 |
| 2008/0077287 A1* | 3/2008 | Yang | B60K 6/50 903/907 |
| 2014/0309077 A1* | 10/2014 | Heglund | F16H 1/28 475/311 |
| 2016/0146264 A1* | 5/2016 | Lemmers, Jr. | F16D 9/02 192/82 T |
| 2018/0237154 A1* | 8/2018 | Tanaka | H02K 7/18 |

FOREIGN PATENT DOCUMENTS

| | | |
|---|---|---|
| JP | 2002-235558 A | 8/2002 |
| WO | 2016/143331 A1 | 9/2016 |

* cited by examiner

ELECTRIC POWER GENERATING APPARATUS FOR USE IN AIRCRAFT

CROSS REFERENCE TO RELATED APPLICATIONS

This application is a National Stage of International Application No. PCT/JP2018/042644 filed Nov. 19, 2018.

TECHNICAL FIELD

The present invention relates to an electric power generating apparatus configured to change speed of rotational power of an aircraft engine and transmit the rotational power to an electric power generator.

BACKGROUND ART

Many of aircrafts include, as main power supplies, electric power generating apparatuses driven by flight engines. As one example of such electric power generating apparatuses, PTL 1 discloses a drive mechanism-integrated electric power generating apparatus (Integrated Drive Generator; IDG). This electric power generating apparatus integrally includes an electric power generator and a continuously variable transmission arranged upstream of the electric power generator. Moreover, PTL 2 discloses that a casing of the electric power generating apparatus accommodates an emergency cut-off device (disconnect assembly) capable of cutting off power transmission at a power inlet side of the casing.

CITATION LIST

Patent Literature

PTL 1: Japanese Laid-Open Patent Application Publication No. 2001-158400
PTL 2: U.S. Publication No. 2016/0146264

SUMMARY OF INVENTION

Technical Problem

A case where large rotational frequency fluctuation of power taken out from an engine occurs is assumed, and it is necessary to consider a configuration capable of, even when a rotational frequency fluctuation range of the power becomes large, adjusting a rotational frequency of the power to an appropriate rotational frequency and transmitting the power to the electric power generator. As a countermeasure against this, if a speed change range of a continuously variable transmission of the electric power generating apparatus is made large, the continuously variable transmission needs to be increased in diameter, and the entire apparatus is increased in size, which is not preferable. As a countermeasure which deals with the large rotational frequency fluctuation while preventing the electric power generating apparatus from increasing in size, one idea is that: a small manual transmission (for example, two-stage manual transmission) is provided upstream of the electric power generating apparatus; and the rotational frequency fluctuation range of the power input to the electric power generating apparatus is narrowed by a speed change operation of the manual transmission.

However, when the manual transmission is provided upstream of the electric power generating apparatus, and the power transmission from the engine to the electric power generating apparatus is cut off by the emergency cut-off device at the time of the occurrence of abnormality or the like, the electric power generating apparatus is protected, but the power transmission from the engine to the manual transmission continues.

An object of the present invention is to provide an electric power generating apparatus which includes a manual transmission and can be appropriately protected at the time of the occurrence of abnormality or the like.

Solution to Problem

An electric power generating apparatus for use in an aircraft according to one aspect of the present invention includes: an emergency cut-off device connected to a gear box to which rotational power of an aircraft engine is transmitted; a manual transmission configured to change speed of the rotational power transmitted from the emergency cut-off device, the manual transmission including a plurality of gear stages; and an electric power generator to which the rotational power which has been changed in speed by the manual transmission is transmitted.

According to the above configuration, the manual transmission is arranged downstream of the emergency cut-off device. Therefore, when the emergency cut-off device cuts off power transmission at the time of the occurrence of abnormality, the power transmission to the electric power generator is cut off, and the power transmission to the manual transmission is also cut off. Therefore, in the electric power generating apparatus including the manual transmission, the entire apparatus can be appropriately protected at the time of the occurrence of the abnormality.

The electric power generating apparatus may further include a housing accommodating the manual transmission and the electric power generator.

According to the above configuration, since the manual transmission is accommodated in the housing accommodating the electric power generator, the electric power generating apparatus is made compact, and handling of the electric power generating apparatus is facilitated.

The housing may include an attaching portion at which an input opening is formed. The manual transmission may be arranged in an accommodating space of the housing so as to be located close to the attaching portion. An input shaft of the manual transmission may be inserted into the input opening.

According to the above configuration, since the manual transmission can be arranged in a space formed by increasing the diameter of the attaching portion of the housing, attachment stability of the housing improves, and the electric power generating apparatus can be made compact by effectively utilizing the space.

The manual transmission may be supported by an inner peripheral surface of the attaching portion of the housing.

According to the above configuration, a support structure for the manual transmission accommodated in the housing can be simplified.

The electric power generating apparatus may further include a continuously variable transmission interposed on a power transmission path between the manual transmission and the electric power generator.

According to the above configuration, when the emergency cut-off device cuts off the power transmission, the power transmission to all of the manual transmission, the continuously variable transmission, and the electric power generator is cut off. Thus, the entire apparatus can be appropriately protected at the time of the occurrence of the abnormality.

The continuously variable transmission and the electric power generator may be arranged such that an axis of the continuously variable transmission and an axis of the electric power generator are parallel to each other when viewed from at least one direction. When viewed from a direction along the axes, the manual transmission may arranged so as to overlap the continuously variable transmission and the electric power generator.

According to the above configuration, the electric power generating apparatus can be made compact.

The axis of the continuously variable transmission and the axis of the electric power generator may be lined up in a predetermined arrangement direction. An axis of the output shaft of the manual transmission may be located between the axis of the continuously variable transmission and the axis of the electric power generator in the arrangement direction.

According to the above configuration, a power transmission path extending from the manual transmission through the continuously variable transmission to the electric power generator can be made compact.

The axis of the output shaft of the manual transmission may be arranged between the continuously variable transmission and the electric power generator.

According to the above configuration, the power transmission path extending from the manual transmission through the continuously variable transmission to the electric power generator can be made further compact.

Advantageous Effects of Invention

According to the present invention, the electric power generating apparatus including the manual transmission can be appropriately protected at the time of the occurrence of the abnormality, for example.

DESCRIPTION OF EMBODIMENTS

Hereinafter, an embodiment will be described with reference to the drawings.

Figure 1:
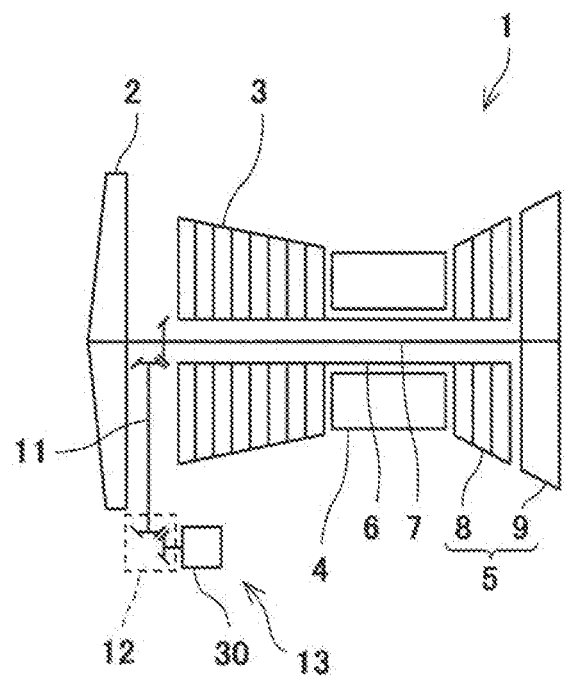
FIG. 1 is a schematic diagram showing an aircraft engine and an electric power generating apparatus according to an embodiment.

FIG. 1 is a schematic diagram showing an aircraft engine 1 and an electric power generating apparatus 13 according to the embodiment. As shown in FIG. 1, the aircraft engine 1 is a two-shaft gas turbine engine and includes a fan 2, a compressor 3, a combustor 4, a turbine 5, a high-pressure shaft 6, and a low-pressure shaft 7. The fan 2 is arranged at a front portion of the aircraft engine 1 and is surrounded by a fan casing. The turbine 5 includes a high-pressure turbine 8 at a front stage side and a low-pressure turbine 9 at a rear stage side. The high-pressure turbine 8 is coupled to the compressor 3 through the high-pressure shaft 6. The high-pressure shaft 6 is a tubular shaft body including therein a hollow space. The low-pressure turbine 9 is coupled to the fan 2 through the low-pressure shaft 7. The low-pressure shaft 7 is inserted into the hollow space of the high-pressure shaft 6.

A connecting shaft 11 extending outward in a radial direction is connected to the low-pressure shaft 7 such that the low-pressure shaft 7 can transmit power to the connecting shaft 11. A gear box 12 is connected to the connecting shaft 11 such that the connecting shaft 11 can transmit the power to the gear box 12. The electric power generating apparatus 13 is connected to the gear box 12 such that the gear box 12 can transmit the power to the electric power generating apparatus 13. To be specific, rotational power of the low-pressure shaft 7 is transmitted through the connecting shaft 11 and the gear box 12 to the electric power generating apparatus 13. Since rotational frequency fluctuation of the low-pressure shaft 7 is larger than rotational frequency fluctuation of the high-pressure shaft 6, a rotational frequency fluctuation range of the power input to the electric power generating apparatus 13 becomes large. It should be noted that the power to be transmitted to the electric power generating apparatus 13 may be taken out from the high-pressure shaft 6 instead of the low-pressure shaft 7.

Figure 2:
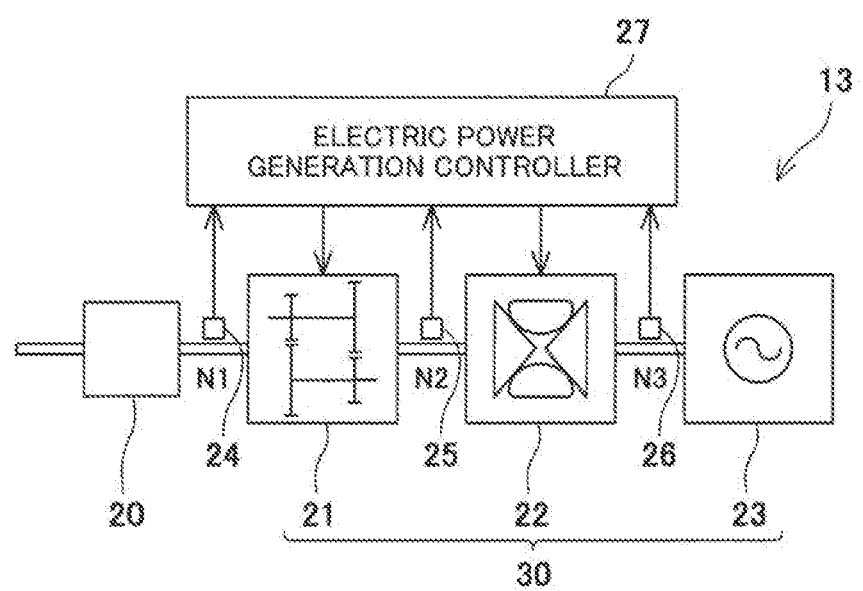
FIG. 2 is a block diagram showing the electric power generating apparatus shown in FIG. 1.

FIG. 2 is a block diagram showing the electric power generating apparatus 13 shown in FIG. 1. As shown in FIG. 2, the electric power generating apparatus 13 includes an emergency cut-off device 20 (disconnect assembly), a manual transmission 21, a continuously variable transmission 22, an electric power generator 23, first to third rotational frequency sensors 24 to 26, and an electric power generation controller 27. The rotational power taken out from the low-pressure shaft 7 of the aircraft engine 1 is input to the electric power generator 23 through the emergency cut-off device 20, the manual transmission 21, and the continuously variable transmission 22.

The emergency cut-off device 20 is a power transmission mechanism to which the rotational power taken out from the aircraft engine 1 is input and which cuts off the power transmission at the time of the occurrence of an emergency. To be specific, the emergency cut-off device 20 is normally maintained in a power transmitting state, and in an emergency, the emergency cut-off device 20 can change from the power transmitting state to a power transmission cut-off state. The emergency cut-off device 20 may be a disconnect which is driven by an external command (for example, a command from a pilot) and cuts off the power transmission, a thermal disconnect which automatically cuts off the power transmission by utilizing the motion of a material by heat characteristic of the material when heat exceeds a predetermined upper limit, or a fuse disconnect which twists and breaks when the input rotational power becomes excessive.

The emergency cut-off device 20 is arranged upstream of the manual transmission 21. Therefore, when the emergency cut-off device 20 cuts off the power transmission at the time of the occurrence of the abnormality, the power transmission to all of the manual transmission 21, the continuously variable transmission 22, and the electric power generator 23 is cut off. Thus, the entire apparatus is appropriately protected at the time of the occurrence of the abnormality.

The rotational power taken out from the aircraft engine 1 is input to the manual transmission 21 through the emergency cut-off device 20. The manual transmission 21 is a transmission configured to select a gear train, by which the power is transmitted, from a plurality of gear trains and perform speed change. In the present embodiment, as one example, the manual transmission 21 is of a two-stage speed change type and includes a lower stage (equal speed stage) and an upper stage (speed increasing stage) having a larger change gear ratio (smaller reduction ratio) than the lower stage. When performing shift-up from the lower stage to the upper stage or performing shift-down from the upper stage to the lower stage, the manual transmission 21 changes from a state where one gear train is being selected to a state where another gear train is being selected through a disengaged state (neutral state).

The rotational power which has been changed in speed by and output from the manual transmission 21 is input to the continuously variable transmission 22. For example, a toroidal continuously variable transmission can be used as the continuously variable transmission 22. The toroidal continuously variable transmission changes the change gear ratio in such a manner that a power roller sandwiched by input and output discs is tilted by changing the position of the power roller by an actuator. Since the toroidal continuously variable transmission is publicly known, the explanation of a detailed structure thereof is omitted. It should be noted that the continuously variable transmission may be of a different type, and for example, may be a hydraulic transmission (Hydro Static Transmission).

The rotational power which has been changed in speed by and output from the continuously variable transmission 22 is input to the electric power generator 23. The electric power generator 23 is an AC generator. For example, when the power having a constant rotational frequency is input to the electric power generator 23, the electric power generator 3 generates alternating current having a constant frequency. The electric power generated by the electric power generator 23 is supplied to an electrical apparatus (not shown) mounted on the aircraft.

The manual transmission 21, the continuously variable transmission 22, and the electric power generator 23 are integrated with each other as an IDG unit 30. To be specific, the manual transmission 21, the continuously variable transmission 22, and the electric power generator 23 are accommodated in a housing 31 (FIG. 3) as described below. It should be noted that the IDG unit 30 may accommodate the emergency cut-off device 20 in addition to the manual transmission 21, the continuously variable transmission 22, and the electric power generator 23.

The first rotational frequency sensor 24 detects an input rotational frequency N1 of the manual transmission 21. The second rotational frequency sensor 25 detects an output rotational frequency N2 of the manual transmission 21 (i.e., an input rotational frequency of the continuously variable transmission 22). The third rotational frequency sensor 26 detects an output rotational frequency N3 of the continuously variable transmission 22. The electric power generation controller 27 controls a speed change operation of the manual transmission 21 and a speed change operation of the continuously variable transmission 22 in accordance with the rotational frequencies N1, N2, and N3 detected by the first to third rotational frequency sensors 24 to 26.

Figure 3:
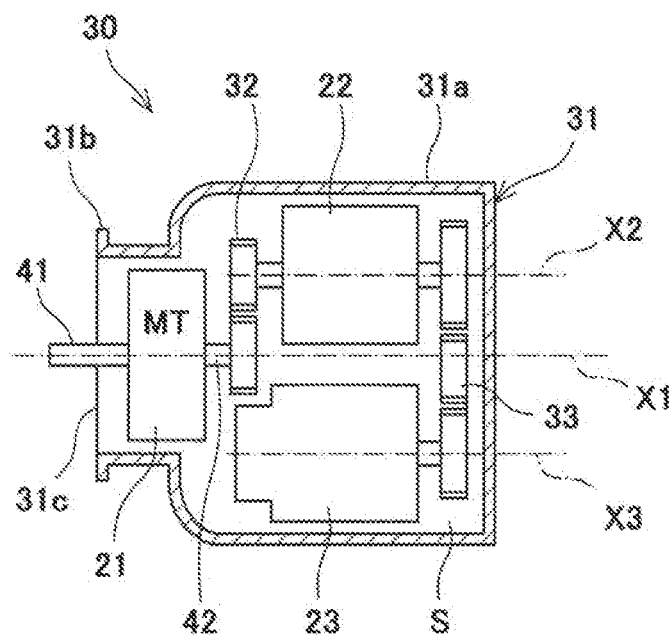
FIG. 3 is a sectional view showing an IDG unit shown in FIG. 2.
Figure 4:
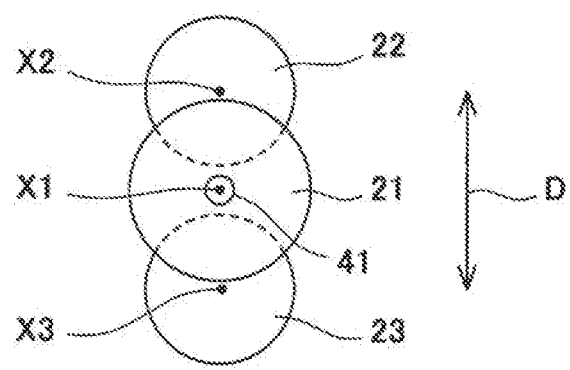
FIG. 4 is a diagram when viewed from a direction indicated by an arrow IV shown in FIG. 3.

FIG. 3 is a sectional view showing the IDG unit 30 shown in FIG. 2. FIG. 4 is a diagram when viewed from a direction indicated by an arrow IV shown in FIG. 3. As shown in FIGS. 3 and 4, the IDG unit 30 includes the housing 31 accommodating the manual transmission 21, the continuously variable transmission 22, and the electric power generator 23. To be specific, since the manual transmission 21 is accommodated in the housing 31 accommodating the continuously variable transmission 22 and the electric power generator 23, the apparatus is made compact, and handleability of the apparatus improves. The housing 31 includes a housing main body portion 31*a* and an attaching portion 31*b* at which an input opening 31*c* is formed. The manual transmission 21 is connected to the continuously variable transmission 22 through a power transmission mechanism 32 (for example, a gear train). The continuously variable transmission 22 is connected to the electric power generator 23 through a power transmission mechanism 33 (for example, a gear train). A power transmission path (the continuously variable transmission 22, 23) between the manual transmission 21 and the electric power generator 23 is complete in the housing 31.

An axis X1 of the manual transmission 21, an axis X2 of the continuously variable transmission 22, and an axis X3 of the electric power generator 23 are parallel to each other. It should be noted that the term "parallel" does not have to denote "completely parallel," and slight misalignment is acceptable. For example, an angle between the axes may be in a range from 10° to −10°. Moreover, in the present embodiment, the axes X1 to X3 are simply parallel to each other. However, the axes X1 to X3 may be set such that: the axes X1 to X3 are skew lines; and when viewed from one direction, the axes X1 to X3 are parallel to each other. For example, the axes X1 to X3 may be set such that: when viewed from a direction perpendicular to the axis X1 and an arrangement direction D in which the continuously variable transmission 22 and the electric power generator 23 are arranged (i.e., from a viewpoint of FIG. 3), the axes X1 to X3 are parallel to each other; and when viewed from the arrangement direction, at least two of the axes X1 to X3 intersect with each other.

The continuously variable transmission 22 and the electric power generator 23 are provided adjacent to each other in a direction perpendicular to the axes X2 and X3. The manual transmission 21 is arranged in an accommodating space S of the housing 31 so as to be located closer to the attaching portion 31*b* than the continuously variable transmission 22 and the electric power generator 23. An input shaft 41 of the manual transmission 21 is inserted into the input opening 31*c* of the attaching portion 31*b* and projects to an outside.

When viewed from a direction along the axis X1, the manual transmission 21 is arranged so as to overlap the continuously variable transmission 22 and the electric power generator 23. In the arrangement direction D in which the axis X2 of the continuously variable transmission 22 and the axis X3 of the electric power generator 23 are lined up, the axis X1 of an output shaft 42 of the manual transmission 21 is located between the axis X2 of the continuously variable transmission 22 and the axis X3 of the electric power generator 23. In the present embodiment, when viewed from the direction along the axis X1, the axis X1 of the manual transmission 21 is sandwiched between the continuously variable transmission 22 and the electric power generator 23.

Figure 5:
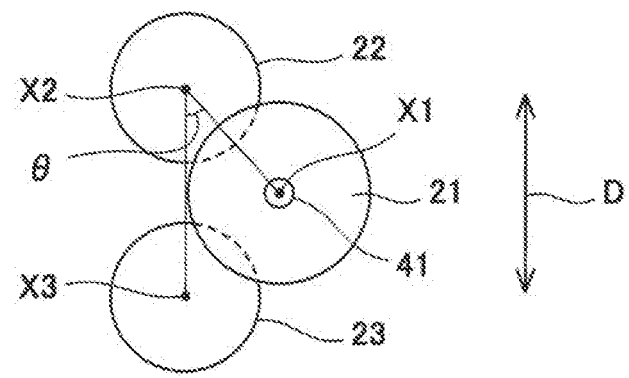
FIG. 5 is a diagram showing Modified Example of FIG. 4.

It should be noted that when viewed from the direction along the axis X1, the manual transmission 21, the continuously variable transmission 22, and the electric power generator 23 do not have to be lined up in a row. For example, as shown in FIG. 5, the axes X1 to X3 may be set such that: the axis X1 of the manual transmission 21 is located between the axis X2 of the continuously variable transmission 22 and the axis X3 of the electric power generator 23 in the arrangement direction D; and a line connecting the axis X1 and the axis X2 may form an angle θ with respect to the arrangement direction D, i.e., the angle θ between a line connecting the axis X2 and the axis X3 and the line connecting the axis X1 and the axis X2 is larger than 0° and smaller than 90°.

In the present embodiment, the input shaft 41 and the output shaft 42 of the manual transmission 21 are coaxially arranged. The axis X1 of the input and output shafts 41 and 42 of the manual transmission 21 is arranged between the continuously variable transmission 22 and the electric power generator 23. According to this configuration, a power transmission path extending from the manual transmission 21 through the continuously variable transmission 22 to the electric power generator 23 is made compact.

The attaching portion 31b is smaller in diameter than the housing main body portion 31a. The continuously variable transmission 22 and the electric power generator 23 are accommodated in the housing main body portion 31a, and the manual transmission 21 is supported by the attaching portion 31b by being fitted to an inner peripheral surface of the attaching portion 31b. To be specific, since the attaching portion 31b of the housing 31 can be utilized as a support structure for the manual transmission 21, the support structure for the manual transmission 21 is simplified. Moreover, since an inner peripheral space of the attaching portion 31b is utilized as an accommodating space accommodating the manual transmission 21, the IDG unit 30 is made compact by effective utilization of the space. Furthermore, since the manual transmission 21 is provided at the inner peripheral surface of the attaching portion 31b of the housing 31, the attaching portion 31b is relatively large in diameter, and attachment stability of the housing 31 improves.

Figure 6:
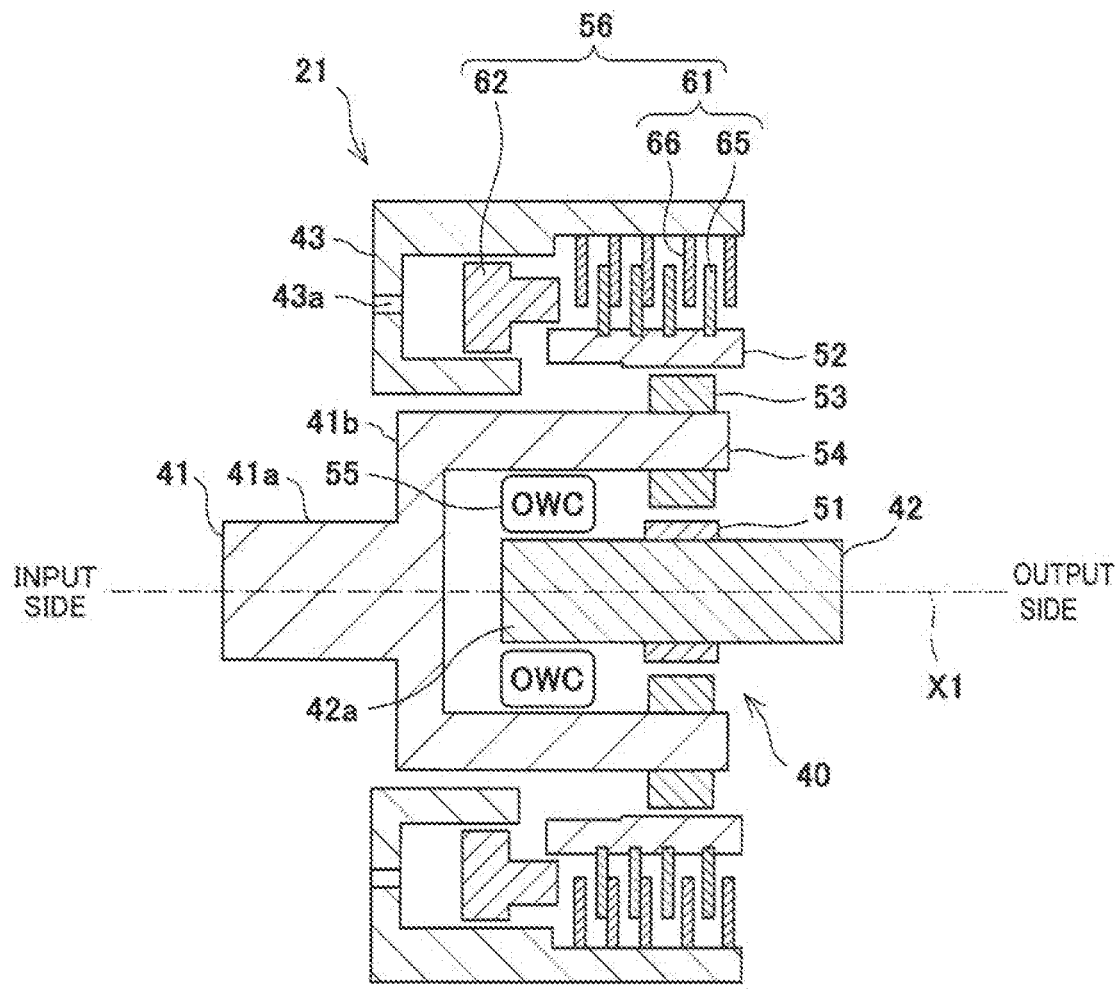
FIG. 6 is a sectional view showing a manual transmission shown in FIG. 3.

FIG. 6 is a sectional view showing the manual transmission 21 shown in FIG. 3. As shown in FIG. 6, the manual transmission 21 includes a planetary gear mechanism 40, the input shaft 41, the output shaft 42, and a casing 43. The planetary gear mechanism 40 includes a sun gear 51, a ring gear 52, a planetary gear 53, a carrier 54, a one-way clutch 55, and a brake 56. The input shaft 41 is connected to the carrier 54 holding the planetary gear 53 of the planetary gear mechanism 40. The output shaft 42 is connected to the sun gear 51 of the planetary gear mechanism 40. The brake 56 supported by the casing 43 is connected to the ring gear 52.

The input shaft 41 includes: a first shaft portion 41a projecting from the casing 43 toward an input side; and a second shaft portion 41b accommodated in the casing 43. The second shaft portion 41b is connected to the carrier 54. The second shaft portion 41b is tubular and includes an internal space that is open toward the output shaft 42. It should be noted that in FIG. 6, the carrier 54 is formed integrally with the input shaft 41, but the carrier 54 may be formed separately from the input shaft 41 and may be fixed to the input shaft 41.

The output shaft 42 includes a tip end portion 42a inserted into the internal space of the tubular second shaft portion 41b. The tip end portion 42a of the output shaft 42 is supported by the second shaft portion 41b of the input shaft 41 through a bearing (not shown) such that the output shaft 42 is rotatable. The sun gear 51 is connected to a portion of the output shaft 42 which portion is located at an output side of the tip end portion 42a (i.e., located downstream of the tip end portion 42a).

The one-way clutch 55 is sandwiched between the input shaft 41 and the output shaft 42. Specifically, the one-way clutch 55 is annular and is sandwiched between an inner peripheral surface of the second shaft portion 41b of the input shaft 41 and an outer peripheral surface of the tip end portion 42a of the output shaft 42. The one-way clutch 55 transmits power only in one rotational direction and does not transmit the power in an opposite rotational direction. The one-way clutch 55 transmits rotational power from the input shaft 41 to the output shaft 42 but does not transmit the rotational power from the output shaft 42 to the input shaft 41. For example, the one-way clutch 55 is of a known sprag type. The one-way clutch 55 is arranged at a radially inner side of the ring gear 52.

The ring gear 52 includes internal teeth which mesh with the planetary gear 53. The brake 56 is connected to an outer peripheral surface of the ring gear 52 while being supported by the casing 43. The brake 56 operates between an operating state in which the ring gear 52 is fixed to the casing 43 and a non-operating state in which the ring gear 52 is rotatable relative to the casing 43. Specifically, the brake 56 includes a friction clutch 61 and a piston 62 configured to apply press-contact force to the friction clutch 61. It should be noted that the brake 56 may include a component other than the friction clutch as long as the brake 56 can realize a state where the ring gear 52 is unrotatable relative to the casing 43 and a state where the ring gear 52 is rotatable relative to the casing 43.

The friction clutch 61 is interposed between an inner peripheral surface of the casing 43 and the outer peripheral surface of the ring gear 52. The friction clutch 61 is, for example, a multiple disc clutch. Specifically, the friction clutch 61 includes a friction plate 65 and a mating plate 66. The friction plate 65 is connected to the ring gear 52 so as to be unrotatable relative to the ring gear 52 and movable relative to the ring gear 52 in the direction along the axis X1. The mating plate 66 is connected to the casing 43 so as to be unrotatable relative to the casing 43 and movable relative to the casing 43 in the direction along the axis X1.

The piston 62 is opposed to the friction clutch 61. The piston 62 is supported by the casing 43 so as to be slidable. The casing 43 includes a hydraulic pressure passage 43a through which hydraulic pressure is applied to the piston 62. Pressure oil is supplied to the hydraulic pressure passage 43b by a hydraulic pump (not shown) driven by the power of the aircraft engine 1.

Since the pressure oil supplied from the hydraulic pressure passage 43a pushes the piston 62, the piston 62 presses the friction clutch 61, and the friction clutch 61 becomes an engaged state (the operating state of the brake 56). When the hydraulic pressure applied from the hydraulic circuit 43a to the piston 62 decreases, and the piston 62 retreats, the friction clutch 61 becomes a disengaged state (the non-operating state of the brake 56). It should be noted that the actuator configured to press the friction clutch 61 is not limited to a hydraulic actuator, such as the piston 62, and may be a different actuator (for example, an electromagnetic actuator).

According to the above configuration, the manual transmission 21 can be formed in a thin shape that is compact in the direction along the axis X1. Therefore, an occupied space located upstream of the continuously variable transmission 22 in the IDG unit 30 is suppressed. Moreover, since the manual transmission 21 is of a thin type, the manual transmission 21b is stably supported by the attaching portion 31b while being accommodated in the inner peripheral space of the attaching portion 31b of the IDG unit 30.

Figure 7A:
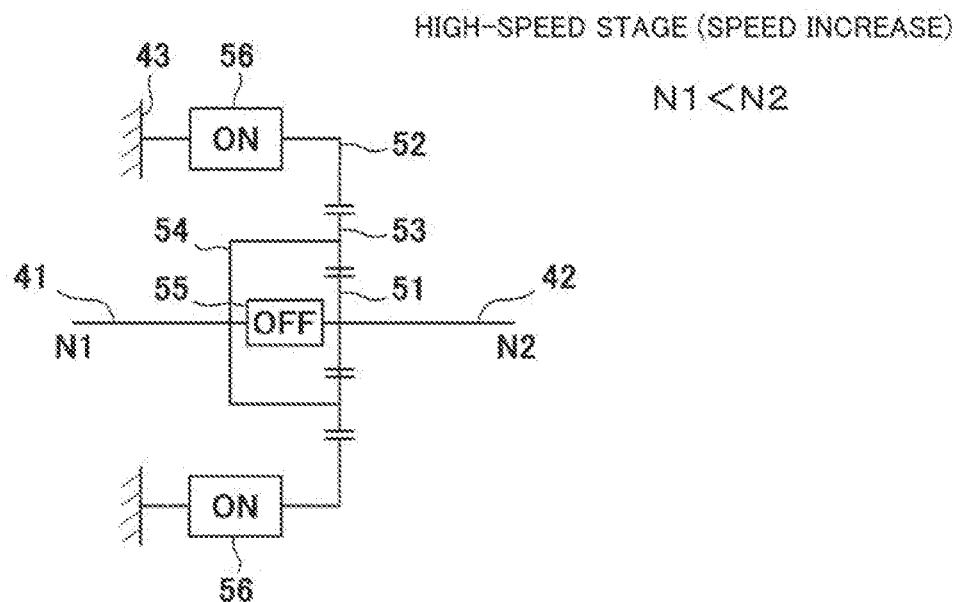
FIGS. 7A and 7B are schematic diagrams for explaining an operation principle of the manual transmission shown in FIG. 6.
Figure 7B:
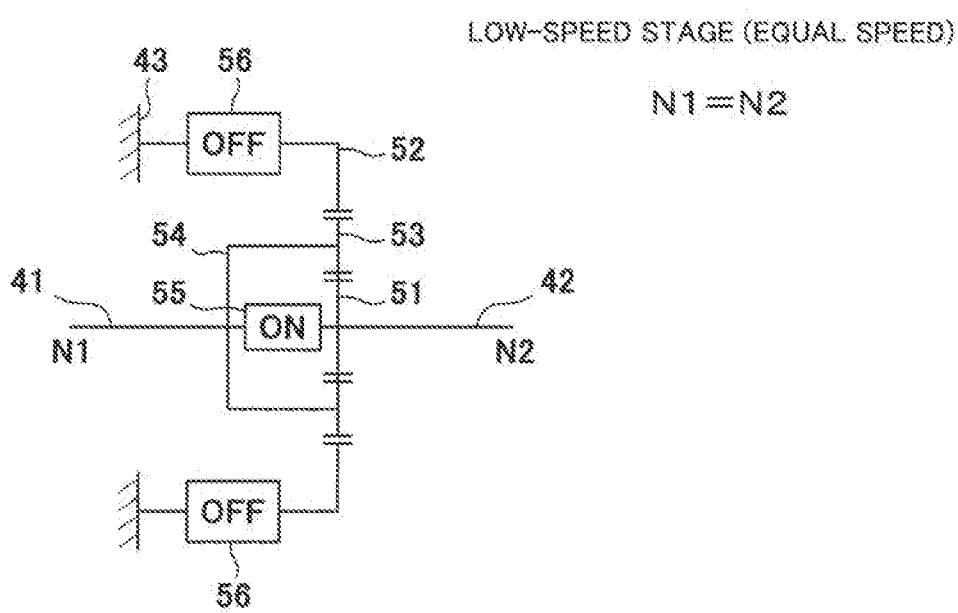

FIGS. 7A and 7B are schematic diagrams for explaining an operation principle of the manual transmission 21 shown in FIG. 6. As shown in FIG. 7A, in the manual transmission 21, when the brake 56 becomes the operating state, the ring gear 52 is fixed to the casing 43, and the rotational power of the input shaft 41 is transmitted to the output shaft 42 through the carrier 54, the planetary gear 53, and the sun gear 51. Thus, speed increase is performed (N1<N2). On the other hand, as shown in FIG. 6B, in the manual transmission 21, when the brake 56 becomes the non-operating state, the ring gear 52 is rotatable relative to the casing 43, and the rotational power of the input shaft 41 is transmitted to the output shaft 42 through the one-way clutch 55 at equal speed (N1=N2).

To be specific, when the brake 56 becomes the operating state, the manual transmission 21 becomes a high-speed stage (speed increase) that is the upper stage. When the brake 56 becomes the non-operating state, the manual transmission 21 is set to a low-speed stage (equal speed) that is the lower stage. However, the present embodiment is not limited to this as long as the upper stage is larger in a speed increasing ratio (smaller in the reduction ratio) than the lower stage. For example, the combination of two gear stages (the high-speed stage and the low-speed stage) of the manual transmission 21 does not have to be the combination of the speed increasing stage and the equal speed stage and may be, for example, the combination of the speed increasing stage and a speed decreasing stage or the combination of the equal speed stage and the speed decreasing stage.

According to this configuration, when the brake 56 changes from the operating state to the non-operating state, the rotational frequency of the output shaft 42 connected to the load (electric power generator 23) decreases as compared to the rotational frequency of the input shaft 41. When the rotational frequency of the output shaft 42 becomes equal to the rotational frequency of the input shaft 41, the one-way clutch 55 becomes an engaged state, and the rotational power of the input shaft 41 is transmitted to the output shaft 42 at equal speed. To be specific, two-stage speed change (equal speed and speed increase) can be realized by switching the operating state of the brake 56. Then, since the two-stage manual transmission 21 is included in the electric power generating apparatus 13, the apparatus can be made compact.

REFERENCE SIGNS LIST 1 aircraft engine
13 electric power generating apparatus
20 emergency cut-off device
21 manual transmission
22 continuously variable transmission
23 electric power generator
27 electric power generation controller
30 IDG unit
31 housing
31b attaching portion
40 planetary gear mechanism
41 input shaft
42 output shaft
43 casing
51 sun gear
52 ring gear
53 planetary gear
54 carrier
55 one-way clutch
56 brake
61 friction clutch
62 piston

The invention claimed is:

1. An electric power generating apparatus for use in an aircraft,
the electric power generating apparatus comprising:
an emergency cut-off device connected to a gear box to which rotational power of an aircraft engine is transmitted;
a manual transmission configured to change speed of the rotational power transmitted from the emergency cut-off device, the manual transmission including a plurality of gear stages; and
an electric power generator to which the rotational power which has been changed in speed by the manual transmission is transmitted.

2. The electric power generating apparatus according to claim 1, further comprising a housing accommodating the manual transmission and the electric power generator.

3. The electric power generating apparatus according to claim 2, wherein:
the housing includes an attaching portion at which an input opening is formed;
the manual transmission is arranged in an accommodating space of the housing so as to be located close to the attaching portion; and
an input shaft of the manual transmission is inserted into the input opening.

4. The electric power generating apparatus according to claim 3, wherein the manual transmission is supported by an inner peripheral surface of the attaching portion of the housing.

5. The electric power generating apparatus according to claim 1, further comprising a continuously variable transmission interposed on a power transmission path between the manual transmission and the electric power generator.

6. The electric power generating apparatus according to claim 5, wherein:
the continuously variable transmission and the electric power generator are arranged such that an axis of the continuously variable transmission and an axis of the electric power generator are parallel to each other when viewed from at least one direction; and
when viewed from a direction along the axes, the manual transmission is arranged so as to overlap the continuously variable transmission and the electric power generator.

7. The electric power generating apparatus according to claim 6, wherein:
the axis of the continuously variable transmission and the axis of the electric power generator are lined up in a predetermined arrangement direction; and
an axis of the output shaft of the manual transmission is located between the axis of the continuously variable transmission and the axis of the electric power generator in the arrangement direction.

8. The electric power generating apparatus according to claim 7, wherein the axis of the output shaft of the manual transmission is arranged between the continuously variable transmission and the electric power generator.

* * * * *